(12) United States Patent
Tanaka et al.

(10) Patent No.: US 7,678,858 B2
(45) Date of Patent: Mar. 16, 2010

(54) FLUORINE-CONTAINING ELASTOMER COMPOSITION EXCELLENT IN PLASMA-AGING PREVENTION EFFECT AND SHAPED ARTICLE MADE THEREOF

(75) Inventors: Hiroyuki Tanaka, Settsu (JP); Kouji Fukuyama, Settsu (JP); Tsuyoshi Noguchi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 1037 days.

(21) Appl. No.: 10/553,976

(22) PCT Filed: Apr. 21, 2004

(86) PCT No.: PCT/JP2004/005688

§ 371 (c)(1),
(2), (4) Date: Oct. 20, 2005

(87) PCT Pub. No.: WO2004/094527

PCT Pub. Date: Nov. 4, 2004

(65) Prior Publication Data

US 2006/0235140 A1    Oct. 19, 2006

(30) Foreign Application Priority Data

Apr. 22, 2003 (JP) .............. 2003-117520
Nov. 11, 2003 (JP) .............. 2003-381323

(51) Int. Cl.
*C08L 27/12* (2006.01)
(52) U.S. Cl. .............. 524/544; 524/99; 526/247
(58) Field of Classification Search ............. 524/544, 524/99; 526/247
See application file for complete search history.

(56) References Cited

U.S. PATENT DOCUMENTS

| | | | | |
|---|---|---|---|---|
| 5,541,258 A | * | 7/1996 | Aonuma et al. | 525/166 |
| 5,698,363 A | * | 12/1997 | Katsuda et al. | 430/200 |
| 6,110,549 A | * | 8/2000 | Hamada et al. | 428/35.2 |
| 6,252,001 B1 | * | 6/2001 | Babb et al. | 525/202 |
| 6,642,300 B1 | * | 11/2003 | Kawaguchi et al. | 524/544 |
| 6,837,918 B2 | * | 1/2005 | Pozarnsky et al. | 95/149 |
| 6,870,662 B2 | * | 3/2005 | Tseng et al. | 359/296 |
| 7,323,515 B2 | * | 1/2008 | Hayashida et al. | 525/180 |
| 2008/0287627 A1 | * | 11/2008 | Noguchi et al. | 526/247 |

FOREIGN PATENT DOCUMENTS

| | | | |
|---|---|---|---|
| EP | 432911 A1 | * | 6/1991 |
| EP | 1182230 A1 | * | 2/2002 |
| JP | 3-185042 A | | 8/1991 |
| JP | 05-279535 | * | 10/1993 |
| JP | 5-279535 A | | 10/1993 |
| JP | 7-3099 A | | 1/1995 |
| JP | 7-179704 A | | 7/1995 |
| JP | 2000-309704 A | | 11/2000 |
| JP | 2001-192643 A | | 7/2001 |
| JP | 2002-161264 | * | 6/2002 |
| JP | 2002-161264 A | | 6/2002 |
| JP | 2003-55577 A | | 2/2003 |
| WO | WO-2004/094527 A1 | * | 11/2004 |

* cited by examiner

*Primary Examiner*—Peter D. Mulcahy
*Assistant Examiner*—Henry Hu
(74) *Attorney, Agent, or Firm*—Sughrue Mion, PLLC

(57) ABSTRACT

The present invention provides a fluorine containing elastomer composition which does not affect heat resistance and processability, is little in weight change for both of fluorine plasma and oxygen plasma exposed at the production step of a semiconductor and can inhibit generation of foreign objects (particles) significantly in those steps, and a molded article comprising the composition. The present invention relates to a fluorine containing elastomer composition for the seal material of a semiconductor production device comprising a fluorine containing elastomer and a compound having plasma antiaging effects.

7 Claims, No Drawings

# FLUORINE-CONTAINING ELASTOMER COMPOSITION EXCELLENT IN PLASMA-AGING PREVENTION EFFECT AND SHAPED ARTICLE MADE THEREOF

TECHNICAL FIELD

The present invention relates to a fluorine containing elastomer composition which does not affect heat resistance and processability, is little in weight change for both of fluorine plasma and oxygen plasma exposed at the production step of a semiconductor and gives a molded article without generating foreign objects (particles) in those steps, and a molded article comprising the composition.

BACKGROUND ART

Since a fluorine containing elastomer, in particular, a perfluoro elastomer, comprising a tetrafluoroethylene (TFE) unit as a main, exhibits excellent chemical resistance, solvent resistance and heat resistance, it is widely used as a seal material and the like under severe environment such as an aerospace field, a semiconductor production device field and a chemical plant field.

Among those, in a semiconductor production step, CVD is used as a step of forming an insulation film and a metal wiring thin film, and elastomeric seal materials are used for sealing various linking portions and mobile portions in a CVD device. It is required for these seal materials that they have not only seal properties but also can endure severe plasma processing conditions at a high density ($10^{12}$ to $10^{13}/cm^3$) caused by miniaturization and jumboization of a substrate wafer and do not stain a semiconductor which is required to have a extreme precision process. A crosslinkable fluorine containing elastomer and a silicone elastomer are adopted as the elastomeric material for the seal material which can satisfy such a requirement. Further, an organic or an inorganic filler is usually compounded for attaining more sufficient mechanical strength than in case of crosslinkable an elastomer alone. Examples of fillers conventionally used or proposed are carbon black, silica (for example, see Japanese Patents No. 2783576 and No. 2858198), polytetrafluoroethylene (PTFE) powder, titanium oxide powder, clay, talc, and barium sulfate.

The fillers are required to be stable for various plasmas such as oxygen as a representative, which are used at process of forming thin film by CVD, fluorine plasma which is used for cleaning the inside of a chamber of a CVD device, and cleaning plasma by fluorine radical of high concentration utilizing $NF_3$ remote plasma.

As fillers stable for these treatment, it is known that an alumina filler and an imide filler are used (for example, see the pamphlet of International Patent Publication No. 00/64980 and the pamphlet of International Patent Publication No. 01/32782). These fillers are stable for treatment of both of oxygen plasma and fluorine plasma, and weight reduction caused by decomposition can be suppressed. Further, it is known that the weight reduction of a filler caused by such treatment affects adversely a semiconductor and a liquid crystal as unnecessary foreign objects (particles) in any form, but the generation of such particles can be suppressed by suppressing the weight reduction. However, it is required to further improve plasma resistance in the production field of semiconductors for which extreme precision process is required.

On the other hand, it has been known that a pigment composition is mixed with a polymer organic material (for example, Japanese Unexamined Patent Publication No. 6-166827). However, the polymer organic material used in the publication assumes materials such as a polyvinyl chloride and a polyolefin which do not contain a fluorine atom. Further, since the pigment composition is used for coloring the polymer organic material, the addition amount is extremely trace and the plasma resistance is not taken into account at all.

Further, antioxidants such as polysaccharides grafted with an antioxidant which has high resistance against decomposition by hydroxy radicals are known (for example, Japanese Unexamined Patent Publication No. 9-12603). However, the antioxidant is usually added for preventing the oxidation of a resin, and there has been no concept that an antioxidant is added to a fluorine containing elastomer having high oxidation resistance, in order to aim the effect of preventing oxidation.

It is an object of the present invention to provide a fluorine containing elastomer composition which maintains heat resistance and processability under directly exposing environment by plasma in the same manner as the inside of a dry-etching device, has little weight change for both of fluorine plasma and oxygen plasma exposing at the production step of a semiconductor, and does not generate foreign objects (particles) at these treatment steps; and a molded article comprising the composition.

DISCLOSURE OF INVENTION

Namely, the present invention relates to a fluorine containing elastomer composition for the seal material of a semiconductor production device comprising a fluorine containing elastomer and a compound having plasma antiaging effects.

The compound having plasma antiaging effects is preferably an aromatic compound and the aromatic compound is a compound satisfying at least one condition selected from a group consisting of:

(1) —NH— composes one portion of the ring structure of the aromatic compound, or one side of —NH— is directly bonded with the ring structure of the aromatic compound;

(2) —C(O)— composes one portion of the ring structure of the aromatic compound;

(3) —S— is directly bonded with the ring structure of the aromatic compound;

(4) —OH is directly bonded with the ring structure of the aromatic compound; and (5) at least one side of (—O—)$_3$P is directly bonded with the ring structure of the aromatic compound.

The fluorine containing elastomer is preferably a perfluoro elastomer.

The compound having plasma antiaging effect is preferably at least one selected from the group consisting of an isoindolinone pigment, a quinacridone pigment, a diketopyrrolopyrrole pigment, an anthraquinone pigment, an amine antioxidant, a phenol antioxidant, a sulfur antioxidant and a phosphorous antioxidant.

The compound having plasma antiaging effects is preferably a compound containing no metal atom.

It is preferable that the compound having plasma antiaging effect is contained in an amount of at least 0.5 part by weight based on 100 parts by weight of the fluorine containing elastomer.

Also, the present invention relates to the fluorine containing elastomer composition for the seal material of a semiconductor production device for plasma process.

Further, the present invention relates to a seal material for a semiconductor production device comprising the fluorine containing elastomer composition and a seal material for a semiconductor production device for plasma process comprising the fluorine containing elastomer composition.

BEST MODE FOR CARRYING OUT THE INVENTION

The present invention relates to a fluorine containing elastomer composition for the seal material of a semiconductor production device which comprises a fluorine containing elastomer and a compound having plasma antiaging effects.

In the present invention, the fluorine containing elastomer is used from the viewpoint of having chemical resistance, heat resistance and resistance to all plasma, but it is more preferable to use a perfluoro elastomer from the viewpoint of being further excellent in chemical resistance, heat resistance and plasma resistance to plasma.

The fluorine containing elastomer preferably used in the present invention is not specifically limited, so far as it is conventionally used for a seal material, in particular, for the seal material of a semiconductor production device.

Example of the fluorine containing elastomer are a fluorine rubber (a), a thermoplastic fluorine rubber (b) and a rubber composition comprising those fluorine rubbers.

Examples of the fluorine rubber (a) are a non-perfluoro fluorine rubber (a-1) and a perfluoro fluorine rubber (a-2).

Examples of the thermoplastic fluorine rubber (b) is fluorine containing multiple segmented polymer (b-1) comprising an elastomeric fluorine containing polymer chain segment and a non-elastomeric fluorine containing polymer chain segment, in which at least 90% by mol of composition units of each of the elastomeric fluorine containing polymer chain segment and the non-elastomeric fluorine containing polymer chain segment is perhalo olefin; a fluorine containing multiple segmented polymer (b-2) in which at least 90% by mol of the composition unit of the elastomeric fluorine containing polymer chain segment is a perhalo olefin and the non-elastomeric fluorine containing polymer chain segment contains less than 90% by mol of perhalo olefin as the composition unit; and also a fluorine containing multiple segmented polymer (b-3) in which the elastomeric fluorine containing polymer chain segment contains less than 90% by mol of a perhalo olefin as the composition unit and at least 90% by mol of the composition unit of the non-elastomeric fluorine containing polymer chain segment is perhalo olefin, or contains less than 90% by mol of perhalo olefin as the composition unit.

Examples of the non-perfluoro fluorine rubber (a-1) are a vinylidene fluoride (VdF) fluorine rubber, a tetrafluoroethylene (TFE)/propylene fluorine rubber, a tetrafluoroethylene (TFE)/propylene/vinylidene fluoride (VdF) fluorine rubber, an ethylene/hexafluoropropylene (HFP) fluorine rubber, an ethylene/hexafluoropropylene (HFP)/vinylidene fluoride (VdF) fluorine rubber, an ethylene/hexafluoropropylene (HFP)/tetrafluoroethylene (TFE) fluorine rubber, a fluorosilicone fluorine rubber, or a fluorophosphazene fluorine rubber. These can be used solely respectively, or in a combination use arbitrarily within the scope in which the effect of the present invention is not lost.

The vinylidene fluoride fluorine rubber is a fluorine containing elastomer comprising 45 to 85% by mol of vinylidene fluoride and 55 to 15% by mol of at least one other monomer copolymerizable with vinylidene fluoride. Preferably, it is a fluorine containing elastomer comprising 50 to 80% by mol of vinylidene fluoride and 50 to 20% by mol of at least one other monomer polymerizable with vinylidene fluoride.

Examples of at least one other monomer copolymerizable with vinylidene fluoride are fluorine containing monomers such as tetrafluoroethylene (TFE), chlorotrifluoroethylene (CTFE), trifluoroethylene, hexafluoropropylene (HFP), trifluoropropylene, tetrafluoropropylene, pentafluoropropylene, trifluorobutene, tetrafluoroisobutene, perfluoro(alkyl vinyl ether) (PAVE) and vinyl fluoride; and non-fluorine monomers such as ethylene, propylene and alkyl vinyl ether. Those can be used solely respectively, or in a combination use arbitrarily combination. Among those, tetrafluoroethylene, hexafluoropropylene and perfluoro(alkyl vinyl ether) are preferably used.

Examples of a rubber are a VdF-HFP rubber, a VdF-HFP-TFE rubber, a VdF-CTFE rubber, a VdF-CTFE-TFE rubber.

The tetrafluoroethylene/propylene fluorine rubber is a fluorine containing copolymer comprising 45 to 70% by mol of tetrafluoroethylene and 55 to 30% by mol of propylene, and further containing 0 to 5% by mol of a monomer which gives a crosslinking site based on the total amount of tetrafluoroethylene and propylene.

Examples of the monomer giving a crosslinking site are an iodine containing monomer such as perfluoro(6,6-dihydro-6-iodo-3-oxa-1-hexene) and perfluoro(5-iodo-3-oxa-1-pentene) which are described in, for example, Japanese Examined Patent Publication No. 5-63482 and Japanese Unexamined Patent Publication No. 7-316234; a bromine containing monomer described in Japanese Unexamined Patent Publication No. 4-505341; a nitrile group containing monomer, a carboxyl group containing monomer and an alkoxycarbonyl group containing monomer which are described in Japanese Unexamined Patent Publication No. 4-505345 and Japanese Unexamined Patent Publication No. 5-500070.

These non-perfluoro fluorine rubbers (a-1) can be prepared by a conventional process. An example of a commercially available rubber among those non-perfluoro fluorine rubbers (a-1) is DAI-EL G-800 series and G-900 series made by Daikin Industries Ltd.

An example of the perfluoro fluorine rubber (a-2) is a fluorine containing elastomer comprising tetrafluoroethylene/perfluoro(alkyl vinyl ether)/a monomer giving a crosslinking site. The composition of tetrafluoroethylene/perfluoro(alkyl vinyl ether) is preferably 50 to 90/10 to 50 (% by mol), more preferably 50 to 80/20 to 50 (% by mol) and further preferably 55 to 70/30 to 45 (% by mol). The monomer giving a crosslinking site is preferably 0 to 5% by mol based on the total amount of tetrafluoroethylene and perfluoro(alkyl vinyl ether) and more preferably 0 to 2% by mol. When the composition is out of the range of those compositions, properties as a rubber elastomer is lost and tends to have similar properties to a resin.

Examples of perfluoro(alkyl vinyl ether) in this case are perfluoro(methyl vinyl ether), perfluoro(propyl vinyl ether), and those can be used solely respectively or in a combination use arbitrarily within a range in which the effect of the present invention is not lost.

Examples of the monomer giving a crosslinking site are an iodine or bromine containing monomer represented by the formula (1):

$$CX^1_2=CX^1-R_f^1CHR^1X^2 \tag{1}$$

(wherein $X^1$ is H, F or $CH_3$, $R_f^1$ is a fluoroalkylene group, a perfluoroalkylene group, a fluoropolyoxyalkylene group or a perfluoropolyoxyalkylene group, $R^1$ is H or $CH_3$, and $X^2$ is an iodine atom or a bromine atom), and a monomer represented by the formula (2):

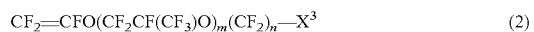

$$CF_2=CFO(CF_2CF(CF_3)O)_m(CF_2)_n-X^3 \tag{2}$$

(wherein m is an integer of 0 to 5, n is an integer of 1 to 3, and $X^3$ is a nitrile group, a carboxyl group, an alkoxycarbonyl group or a bromine atom), and the like. These can be used solely respectively or in a combination use arbitrarily.

The iodine atom, the nitrile group, the carboxyl group, the alkoxycarbonyl group and the bromine atom can function as crosslinking points.

The perfluoro fluorine rubber (a-2) can be prepared by a conventional process.

Examples of the perfluoro fluorine rubber (a-2) are fluorine rubbers described in the pamphlet of International Patent Publication No. 97/24381, Japanese Examined Patent Publication No. 61-57324, Japanese Examined Patent Publication No. 4-81608, Japanese Examined Patent Publication No. 5-13961 and the like.

The fluorine containing multiple segmented polymer (b-1) which is the thermoplastic fluorine rubber (b) is explained in the following.

First, the elastomeric fluorine containing polymer chain segment is explained. The elastomeric fluorine containing polymer chain segment gives flexibility to a polymer, and its glass transition point is at most 25° C. and preferably at most 0° C. Examples of the perhalo olefin composing at least 90% by mol of the composition unit are tetrafluoroethylene, chlorotrifluoroethylene, hexafluoropropylene, perfluorovinyl ether represented by the formula (3):

$$CF_2=CFO(CF_2CFX^4O)_p-(CF_2CF_2CF_2O)_q-R_f^2 \quad (3)$$

(wherein $X^4$ is F or $CF_3$, $R_f^2$ is a perfluoroalkyl group having 1 to 5 carbon atoms, p is an integer of 0 to 5, and q is an integer of 0 to 5).

Examples of the composition unit composing the elastomeric fluorine containing polymer chain segment other than the perhalo olefin may be fluorine containing monomers such as vinylidene fluoride, trifluoroethylene, trifluoropropylene, tetrafluoropropylene, pentafluoropropylene, trifluorobutene, tetrafluoroisobutene and vinyl fluoride; and non-fluorine monomers such as ethylene, propylene and alkyl vinyl ether.

A preferable example of the elastomeric fluorine containing polymer chain segment is an elastomeric polymer chain comprising tetrafluoroethylene/perfluoro(alkyl vinyl ether)/a monomer imparting a crosslinking site. The composition of tetrafluoroethylene and perfluoro(alkyl vinyl ether) is preferably 50 to 85/50 to 15 (% by mol), and the monomer imparting a crosslinking site is preferably 0 to 5% by mol based on the total amount of tetrafluoroethylene and perfluoro (alkyl vinyl ether).

An example of the monomer giving a crosslinking site is a monomer represented by the formula (1) or the formula (2).

Then, the non-elastomeric fluorine containing polymer chain segment is explained. Examples of the perhalo olefin composing at least 90% by mol of the composition unit of the non-elastomeric fluorine containing polymer chain segment are tetrafluoroethylene, chlorotrifluoroethylene, perfluoro (alkyl vinyl ether), hexafluoropropylene, a compound represented by the formula (4):

$$CF_2=CF(CF_2)_pX^5 \quad (4)$$

(wherein p is an integer of 1 to 10, and $X^5$ is a fluorine atom or a chlorine atom), and a perhalo olefin such as perfluoro-2-butene.

Examples of the composition unit composing the non-elastomeric fluorine containing polymer chain segment other than the perhalo olefin are those similar to the composition unit composing the elastomeric fluorine containing polymer chain segment other than perhalo olefin.

A preferable example of the non-elastomeric fluorine containing polymer chain segment is a non-elastomeric polymer chain comprising 85 to 100% by mol of tetrafluoroethylene and 0 to 15% by mol of a monomer represented by the formula (5):

$$CF_2=CF-R_f^3 \quad (5)$$

(wherein $R_f^3$ is $R_f^4$ or $-OR_f^4$, and $R_f^4$ is a perfluoroalkyl group having 1 to 5 carbon atoms).

Also, the fluorine containing multiple segmented polymer (b-1) preferably comprises 50 to 95% by weight of the elastomeric fluorine containing polymer chain segment and 5 to 50% by weight of the non-elastomeric fluorine containing polymer chain segment.

The crystal melting point of the non-elastomeric fluorine containing polymer chain segment is preferably at least 150° C. and more preferably 200 to 360° C. from the viewpoint of the heat resistance of the obtained fluorine containing multiple segmented polymer.

Consequently, it is important that the fluorine containing multiple segmented polymer is a fluorine containing multiple segmented polymer in which the elastomeric fluorine containing polymer chain segment and the non-elastomeric fluorine containing polymer chain segment are bonded in forms of a block or a graft in one molecule.

Accordingly, as the preparation process of the fluorine containing multiple segmented polymer (b-1), publicly known various processes can be adopted in order to bond the elastomeric segment with the non-elastomeric segment in forms of a block or a graft to obtain the fluorine containing multiple segmented polymer. Among those, there can be preferably adopted the preparation process of a block type of fluorine containing multiple segmented polymer shown in Japanese Examined Patent Publication No. 58-4728 and the preparation process of a graft type of a fluorine containing multiple segmented polymer shown in Japanese Unexamined Patent Publication No. 62-34324.

In particular, since a segmentation ratio (blocking ratio) is high and a homogeneous and orderly segmented polymer is obtained, a block type fluorine containing multiple segmented polymer synthesized by so-called iodine transfer polymerization process described in Japanese Examined Patent Publication No. 58-4728 and Japanese Journal of Polymer Science and Technology (KOBUNSHI RONBUNSHU) (Vol. 49, No. 10, 1992) is preferable.

On the other hand, a mere mixture of the elastomeric fluorine containing polymer and the non-elastomeric fluorine containing polymer tends to be generally inadequate in mechanical properties (in particular, at high temperature) and lower heat resistance, flexibility and endurance, depending on the kinds of respective mixed polymers, mixing properties, compatibility and the like.

To the contrary, heat resistance, mechanical properties (in particular, at high temperature) and the like are improved by bonding elastomeric segments and non-elastomeric segments with blocking and grafting to prepare a multiple segmented polymer, in comparison with the above described mere mixture of the elastomeric fluorine containing polymer and the non-elastomeric fluorine containing polymer.

The elastomeric segments can be prepared by the iodine transfer polymerization process which is known as the preparaiton process of a fluorine rubber (Japanese Examined Patent Publication No. 58-4728, Japanese Unexamined Patent Publication No. 62-12734). For example, there is a process of emulsion-polymerizing perhalo olefin composing the above described elastomeric segment with a monomer giving a curing site if necessary, which is carried out in water medium in the presence of an iodine compound, preferably a diiodine compound under pressurizing while agitating in the presence of a radical initiator and essentially free of oxygen. The typical example of the used diiodine compound is a compound represented by the formula (6):

$$R^2I_xBr_y \quad (6)$$

(wherein $R^2$ is a saturated or unsaturated fluorohydrocarbon group having 1 to 16 carbon atoms or a chlorofluorohydrocarbon group, or a hydrocarbon group having 1 to 3 carbon atoms, each of x and y is an integer of 0 to 2, and $1 \leq x+y \leq 2$). Iodine or bromine which are introduced in this way functions as crosslinking points.

Examples of the compound represented by the formula (6) are 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, monoiodo-monobromo substituent of 2-bromo-4-iodoperfluorobutene-1-benzene, diiodo-monobromo substituent of the same, and (2-iodoethyl) and (2-bromoethyl) substituent of the same.

These compounds can be used solely or in a combination use of those mutually. Among those, 1,4-diiodoperfluorobutane, diiodomethane and the like are preferably used from viewpoints of polymerization reactivity, crosslinking reactivity, availability and the like.

The amount of the compound represented by the formula (6) is preferably 0.01 to 1% by weight based on the total weight of the elastomeric segment.

The end portion of the elastomeric segment thus obtained is a perhalo type and has an iodine atom which becomes the initiation point of block copolymerization of the non-elastomeric segment.

The radical polymerization initiator used for preparation of the elastomeric segment in the present invention can be the same as those which have been conventionally used for polymerization of the fluorine containing elastomer. Examples of these initiators are an organic or inorganic peroxide and an azo compound. Examples of typical initiators are persulfates, percarbonates, peresters, and an example of a preferable initiator is ammonium persulfate (APS). APS can be used solely or in a combination use of the initiator with a reducing agent such as sulfites or the salts of sulfurous acids.

The elastomeric segments thus obtained which have a number average molecular weight of 5,000 to 750,000 and, in particular, 20,000 to 400,000 are preferable from the viewpoints of imparting flexibility, elasticity and mechanical physical property to the whole fluorine containing multiple segmented polymer.

Then, the block copolymerization of the non-elastomeric segment can be conducted by changing a monomer to a monomer for the non-elastomeric segments, in succession to the emulsion polymerization of the elastomeric segments.

The number average molecular weight of the non-elastomeric segments is preferably 1,000 to 1,200,000 and more preferably 3,000 to 600,000 and can be adjusted in a wide range.

The fluorine containing multiple segmented polymer (b-1) thus obtained comprises a polymer molecule bonded with the non-elastomeric segment on the both sides of the elastomeric segment and a polymer molecule bonded with the non-elastomeric segment at one side of the elastomeric segment as a main components, and a polymer molecule consisting of only the elastomeric segment, with which the non-elastomeric segment is not bonded, is preferably in an amount of at most 20% by weight and more preferably at most 10% by weight based on the total weight of the segments and polymer molecules in the fluorine containing multiple segmented polymer.

The fluorine containing multiple segmented polymer (b-2) is explained in the following.

The elastomeric fluorine containing polymer chain segment is the same as those explained in the above mentioned fluorine containing multiple segmented polymer (b-1).

The non-elastomeric fluorine containing polymer chain segment is a polymer chain having a crystal melting point of at least 150° C. and preferably 200 to 360° C.

The composition unit of the non-elastomeric fluorine containing polymer chain segment includes partially fluorinated olefins such as vinylidene fluoride, vinyl fluoride, trifluoroethylene, a compound represented by the formula (7):

$$CH_2=CX^6-(CF_2)_q-X^6 \quad (7)$$

(wherein $X^6$ is H or F, and q is an integer of 1 to 10) and $CH_2=C(CF_3)_2$.

Also, monomers such as ethylene, propylene, vinyl chloride, a vinyl ether, a vinyl ester of carboxylic acid and acrylic acid can be also used as a copolymerization component.

The fluorine containing multiple segmented polymer (b-2) comprises preferably 50 to 95% by weight of the elastomeric fluorine containing polymer chain segment and 5 to 50% by weight of the non-elastomeric fluorine containing polymer chain segment.

Also, the fluorine containing multiple segmented polymer (b-2) can be prepared in the same manner as the fluorine containing multiple segmented polymer (b-1).

A fluorine containing multiple segmented polymer (b-3) is explained in the following.

The elastomeric fluorine containing polymer chain segment in the fluorine containing multiple segmented polymer (b-3) is a polymer chain having a glass transition point of at most 25° C. and preferably at most 0° C.

Also, the elastomeric fluorine containing polymer chain segment contains less than 90% by mol of the perhalo olefin as the composition unit. The composition unit other than the perhalo olefin in this case includes the same rubber as that explained in the vinylidene fluoride fluorine rubber of the above mentioned non-perfluoro fluorine rubber (a-1).

The non-elastomeric fluorine containing polymer chain segment in the fluorine containing multiple segmented polymer (b-3) can be the same as the non-elastomeric fluorine containing polymer chain segment in the above mentioned fluorine containing multiple segmented polymer (b-1) or (b-2). In particular, the non-elastomeric fluorine containing polymer chain segment can be the same as the non-elastomeric fluorine containing polymer chain segment in (b-2).

Further, the fluorine containing multiple segmented polymer (b-3) comprises preferably 40 to 95% by weight of the elastomeric fluorine containing polymer chain segment and 5 to 60% by weight of the non-elastomeric fluorine containing polymer chain segment.

The fluorine containing multiple segmented polymer (b-3) can be prepared in the same manner as the fluorine containing multiple segmented polymers (b-1) and (b-2).

The specific examples of the fluorine containing multiple segmented polymer (b-3) are DAI-EL THERMO T-530, T-550 and T-630 available from Daikin Industries Ltd., CEFRAL SOFT available from Central Glass Co., Ltd.

In the present invention, a composition comprising the fluorine rubber (a) and the thermoplastic fluorine rubber (b) mentioned above can be also used.

The first fluorine rubber composition comprising the non-perfluoro fluorine rubber (a-1) and the fluorine containing multiple segmented polymer (b-1) can be obtained by mixing the non-perfluoro fluorine rubber (a-1) obtained as mentioned above with the fluorine containing multiple segmented polymer (b-1) in a condition of dispersion, or by dry blend such as an open roll at an arbitrary proportion.

Also, an additive such as a process aid can be appropriately compounded in order to improve mold release properties at molding and the like within a range in which the effect of the present invention is not damaged.

The second fluorine rubber composition comprising the non-perfluoro fluorine rubber (a-1) and the fluorine containing multiple segmented polymer (b-2) can be obtained in the same manner as the first fluorine rubber composition.

In this case, the above mentioned additive can be appropriately compounded within a range in which the effect of the present invention is not damaged.

The third fluorine rubber composition comprising the perfluoro fluorine rubber (a-2) and the fluorine containing multiple segmented polymer (b-3) can be obtained in the same manner as the first fluorine rubber composition.

Further, the above mentioned additive can be appropriately compounded within a range in which the effect of the present invention is not damaged and also a crosslinking agent can be also compounded in accordance with a kind of a crosslinking process described later.

The fourth fluorine rubber composition comprising the perfluoro fluorine rubber (a-2) and the fluorine containing multiple segmented polymer (b-1) can be obtained in the same manner as the first fluorine rubber composition.

The perfluoro fluorine rubber (a-2) and the above mentioned fluorine containing multiple segmented polymer (b-1) are inferior in the efficiency of radiation-induced crosslinking and, practically, cannot be radiation-induced crosslinked. Accordingly, in case of crosslinking, a crosslinking sites by which peroxide crosslinking is possible is introduced into at least one of the rubbers to crosslink.

The fluorine rubber introduced with the crosslinking sites is preferably a fluorine rubber in which iodine or bromine is introduced at the end of the polymer. The fluorine rubber can be prepared by the above mentioned iodine transfer polymerization process. In this case, the addition amount of the compound represented by the formula (6) is preferably 0.0001 to 5% by weight of the total weight of the obtained fluorine rubber and more preferably 0.01 to 1% by weight.

Other process for introducing the crosslinking site is a process of copolymerizing a small amount of the monomer giving the crosslinking site.

Examples of the monomer giving the crosslinking site are preferably an iodine containing monomer such as perfluoro (6,6-dihydro-6-iodo-3-oxa-1-hexene) and perfluoro(5-iodo-3-oxa-1-pentene) described in Japanese Examined Patent Publication No. 5-63482 and Japanese Unexamined Patent Publication No. 7-316234, a bromine containing monomer described in Japanese Unexamined Patent Publication No. 4-505341, a nitrile group containing monomer, a carboxyl group containing monomer and an alkoxycarbonyl group containing monomer described in Japanese Unexamined Patent Publication No. 4-505345 and Japanese Unexamined Patent Publication No. 5-500070.

The fifth fluorine rubber composition comprising the perfluoro fluorine rubber (a-2) and the fluorine containing multiple segmented polymer (b-2) can be obtained in the same manner as the first fluorine rubber composition.

In this case, the above mentioned additive can be appropriately compounded within a range in which the effect of the present invention is not damaged and also a crosslinking agent can be compounded in accordance with a kind of a crosslinking process described later.

Since a mixed gas of monomers used at polymerizing the fluorine containing elastomer used in the present invention has explosibility property as described in G. H. Kalb et al., Advances in Chemistry Series, Vol. 129, 13 (1973), it is required for a polymerization device to be designed not to generate spark and the like causing a firing source. Further, it is preferable that polymerization pressure is suppressed to as low as possible.

The polymerization pressure can be changed within a wide range. Generally, it is preferably within a range of 0.5 to 5 Mpa. The higher the polymerization pressure is, the larger the polymerization speed is; therefore it is more preferably at least 0.8 MPa from the viewpoint of the improvement in productivity.

The fluorine containing elastomer used in the present invention is preferably a copolymer comprising tetrafluoroethylene/perfluoro(alkyl vinyl ether)/a monomer having a crosslinking site from viewpoints of heat resistance and chemical resistance.

Examples of the above mentioned perfluoro(alkyl vinyl ether) are perfluoro(methyl vinyl ether) (PMVE), perfluoro (ethyl vinyl ether) (PEVE), perfluoro(propyl vinyl ether) (PPVE) and, among those, PMVE is preferable from the viewpoint that it is excellent in cold resistance.

Also, the above mentioned monomer having a crosslinking site is preferably an iodine containing monomer, a nitrile group containing monomer, a carboxyl group containing monomer and an alkoxycarbonyl group containing monomer from the viewpoint of copolymerization reactivity. Also, the nitrile group containing monomer is more preferable from the viewpoints of crosslinking reactivity and the heat resistance of a crosslinking structure formed by a crosslinking reaction.

The fluorine containing elastomer can be produced by polymerization process such as an emulsion polymerization process, a suspension polymerization process and a solution polymerization process.

As an emulsifier used for the emulsion polymerization, the salts of carboxylic acid having a fluorocarbon chain or a fluoropolyether chain are desirable from the viewpoint of suppressing chain transfer reaction toward an emulsifier molecule occurring during polymerization. The amount of the emulsifier is preferably about 0.05% to 2% by weight based on added water and, in particular, preferably 0.2% to 1.5% by weight.

As the polymerization initiator used for polymerization of the fluorine containing elastomer, an initiator which can let a carboxyl group or a group capable of forming a carboxyl group (examples are an acyl fluoride group, an acyl chloride group, a —$CF_2OH$ group, and either of these generates a carboxyl group in the presence of water) exist at the end of the elastomer is preferably used. Specific examples are ammonium persulfate (APS) and potassium persulfate (KPS).

Also, a chain transfer agent which is usually used for controlling a molecular weight may be used, but it is better to use as little as possible since the proportion of a group capable of preparing a carboxyl group or an alkoxycarbonyl group introduced at the end is lowered. However, the chain transfer agent can let the above mentioned group exist at the end of the elastomer, it is not limited thereto. When the chain transfer agent is not used, the molecular weight may be controlled by conducting the polymerization at low pressure, for example, less than 2 MPa·G and preferably at most 1 MPa·G. Other polymerization conditions are not specifically limited, but it is preferable that the pH of polymerization solution is set as strongly acidic of less than 3 in order to obtain the polymer product having a carboxyl group at the end and/or a branched chain without acid treatment described later.

The fluorine containing elastomer used in the present invention preferably converts a group such as a metallic salt of a carboxylic acid, an ammonium salt and the like of a carboxylic acid, which exist in a polymer product, into a carboxyl group by acid treatment of the polymer product. As acid treatment, for example, a process of washing with hydrochloric acid, sulfuric acid, nitric acid and the like, or a process of controlling the solution of a mixture after polymerization reaction to be a pH of at most 3 with these acids is appropriate.

It is preferable from the viewpoint of simplification of steps that the acid treatment is applied as a means of coagulation when the polymer product is isolated by coagulation from a mixture of polymerization reaction mixture. Alternatively, the polymer mixture is treated with an acid and, then, the polymer product may be isolated by a means such as freeze drying. Further, processes such as coagulation by ultrasonic waves and coagulation by mechanical force can be also adopted.

Further, a carboxyl group can be introduced by oxidizing the fluorine containing elastomer containing iodine and bromine with fuming nitric acid.

Examples of the curing agent used in the present invention are a curing agent of peroxide crosslinking, a curing agent of a polyol crosslinking, a curing agent of a polyamine crosslinking, a curing agent of a triazine crosslinking, a curing agent of an oxazole crosslinking, a curing agent of an imidazole crosslinking and a curing agent of a thiazole crosslinking.

The curing agent used in peroxide crosslinking may be an organic peroxide which can easily generate peroxy radicals in the presence of heat or oxidation-reduction system and, especially, examples are 1,1-bis(t-butyl peroxy)-3,5,5-trimethylcyclohexane, 2,5-dimethylhexane-2,5-dihydro peroxide, di-t-butyl peroxide, t-butylcumyl peroxide, dicumyl peroxide, α,α-bis(t-butyl peroxy)-p-diisopropylbenzene, 2,5-dimethyl-2,5-di(t-butyl peroxy) hexane, 2,5-dimethyl-2,5-di(t-butyl peroxy)-hexyne-3, benzoyl peroxide, t-butyl peroxybenzene, 2,5-dimethyl-2,5-di(benzoyl peroxy)hexane, t-butyl peroxy maleic acid, t-butylperoxy isopropyl carbonate. A kind and an amount of the organic peroxide used is generally selected by considering the amount of active —O—O—, a decomposition temperature and the like.

Also, the curing aid which can be used in this case may be a compound having reactivity for a peroxy radical and a polymer radical, and examples are a multi functional compound having functional groups such as $CH_2=CH-$, $CH_2=CHCH_2-$ and $CF_2=CF-$. Specifically, examples are triallyl cyanurate, triallyl isocyanurate (TAIC), triacryl formal, triallyl trimellitate, N,N'-n-phenylene bis(maleimide), dipropagyl terephthalate, diallyl phthalate, tetraallyl terephthalate amide, triallyl phosphate, bis(maleimide), fluorinated triallyl isocyanurate (1,3,5-tris(2,3,3-trifluoro-2-propenyl)-1,3,5-triazin-2,4,6-trion), tris(diallylamine)-S-triazine, triallyl phosphite, N,N-diallyl acrylamide, 1,6-divinyl dodecafluorohexane.

An example of the curing agent used for polyol crosslinking is a polyvalent alcohol compound such as bisphenol A and bisphenol AF.

An example of the curing agent used for polyamine crosslinking is a polyvalent amine compound such as hexamethylenediamine carbamate, N,N'-dicinnamylidene-1,6-hexanediamine and 4,4'-bis(aminocyclohexyl)methane carbamate.

An example of the curing agent used for triazine crosslinking is an organic tin compound such as tetraphenyltin and triphenyltin.

Examples of the curing agent used for oxazole crosslinking, imidazole crosslinking and thiazole crosslinking are a bis(diaminophenyl) curing agent, a bis(aminophenol) curing agent and a bis(aminothiophenol) curing agent represented by the formula (8):

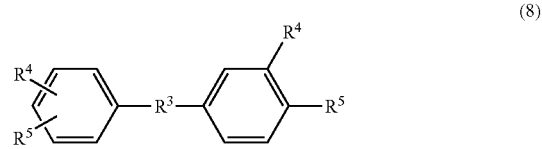

(wherein $R^3$ is $-SO_2-$, $-O-$, $-CO-$, an allylene group having 1 to 6 carbon atoms, a perfluoroalkylene group having 1 to 10 carbon atoms or a single bond, one of $R^4$ and $R^5$ is $-NH_2$ and the other is $-NHR^6$, $-NH_2$, $-OH$ or $-SH$, $R^6$ is a hydrogen atom, a fluorine atom or mono-valent organic group, $R^4$ is preferably $-NH_2$, and $R^5$ is $-NHR^6$), a bis(amidhydrazone) curing agent represented by the formula (9):

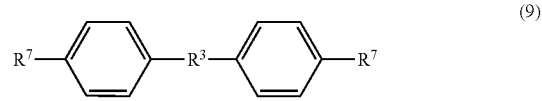

(wherein $R^3$ is the same as the above-mentioned, and $R^7$ is

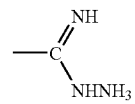

or

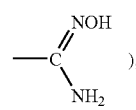

a bis(amidoxime) curing agent represented by the formula (10):

(wherein $R_f^5$ is a perfluoroalkylene group having 1 to 10 carbon atoms) or the formula (11):

(wherein n is an integer of 1 to 10). The bis(aminophenol) curing agent, bis(aminothiophenol) curing agent or bis(di-aminophenyl) curing agent or the like has been conventionally used for a crosslinking system in which a nitrile group is a crosslinking point, but reacts with a carboxyl group and an alkoxycarbonyl group to form an oxazole ring, a thiazole ring and an imidazole ring and provide a crosslinked product.

The particularly preferable curing agent includes a compound having several 3-amino-4-hydroxyphenyl groups or 3-amino-4-mercaptophenyl groups, or a compound represented by the formula (12):

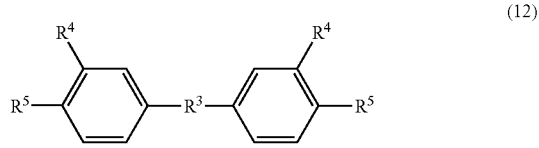

(wherein $R^3$, $R^4$ and $R^5$ are the same as the above-mentioned) and, specifically, examples are 2,2-bis(3-amino-4-hydroxyphenyl)hexafluoropropane (general name: bis(aminophenol) AF), 2,2-bis(3-amino-4-mercaptophenyl)hexafluoropropane, tetraminobenzene, bis-3,4-diaminophenylmethane, bis-3,4-diaminophenyl ether, 2,2-bis(3,4-diaminophenyl)hexafluoropropane, 2,2-bis[3-amino-4-(N-phenylamino)phenyl]hexafluoropropane.

The amount of the curing agent of the fluorine containing elastomer is preferably 0.05 to 10 parts by weight based on 100 parts by weight of the fluorine containing elastomer and more preferably 1 to 5 parts by weight. When the curing agent is less than 0.05 part by weight, the fluorine containing elastomer tends not to be crosslinked sufficiently, and when it exceeds 10 parts by weight, physical properties of a crosslinked product tends to be deteriorated.

The composition of the present invention contains a compound having plasma antiaging effects.

The compound having plasma antiaging effects is an aromatic compound, and the aromatic compound is preferably a compound satisfying at least one condition selected from a group consisting of:
(1) —NH— composes one portion of the ring structure of the aromatic compound, or one side of —NH— is directly bonded with the ring structure of the aromatic compound;
(2) —C(O)— composes one portion of the ring structure of the aromatic compound;
(3) —S— is directly bonded with the ring structure of the aromatic compound;
(4) —OH is directly bonded with the ring structure of the aromatic compound; and
(5) at least one side of (—O—)$_3$P is directly bonded with the ring structure of the aromatic compound.

Herein, the plasma antiaging effect is defined as antiaging effects for plasma of the fluorine containing elastomer composition. A compound having those plasma antiaging effects is stable in both treatments of fluorine plasma and oxygen plasma, and the fluorine containing elastomer composition of the present invention is little in weight reduction caused by decomposition and, further, can provide a molded article which does not generate particles.

Those phenomena are considered that —NH—, —C(O)—, —S—, (—O—)$_3$P and/or —OH contained in the above mentioned compound effectively captures radicals deriving at plasma radiation and inhibits deterioration caused by scission of polymer main chains by radical chains.

Examples of the above mentioned compound include compounds which are generally used as an organic pigment, an antioxidant and an age resistor. Further, the above mentioned antioxidant is classified to a primary antioxidant (a radical chain inhibitor) and a secondary antioxidant (a peroxide decomposition agent) in view of function.

Among the above mentioned compounds, those generally used as an organic pigment or an antioxidant are preferable, since they have a small effect for properties and are excellent in heat resistance, thus, have stable effects even when an environment for use is at a high temperature and, further, there is no generation of particles after plasma irradiation.

Also, it is preferable that those compounds do not contain a metal atom from the viewpoint of clean properties (non-metal) required as a seal material for, particularly, a semiconductor production device.

As the organic pigment, an isoindolinone pigment, a quinacridone pigment, a diketopyrrolopyrrole pigment and an anthraquinone pigment are preferable from the viewpoints that heat resistance and chemical resistance are excellent and there is a small influence imparting for molding properties.

Specifically, examples are represented by formulas in the following but are not limited thereto.

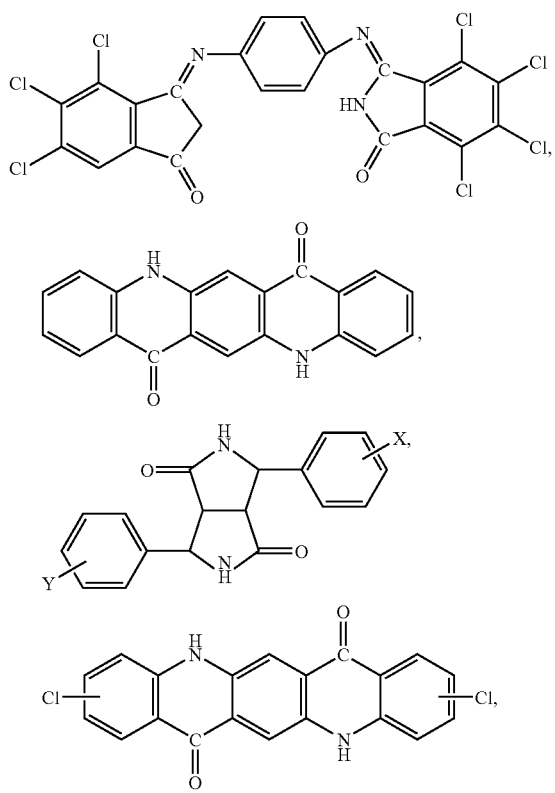

-continued

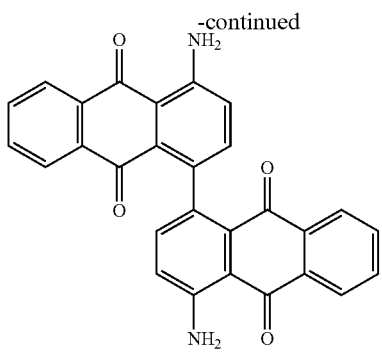

As the antioxidant and the age resistor, an amine compound, a phenol compound, a sulfur compound and a phosphor compound are preferable from the viewpoint of the plasma antiaging effects. Specifically, examples are triphenylphosphite $((C_6H_5O)_3P)$, compounds represented by the following formulas:

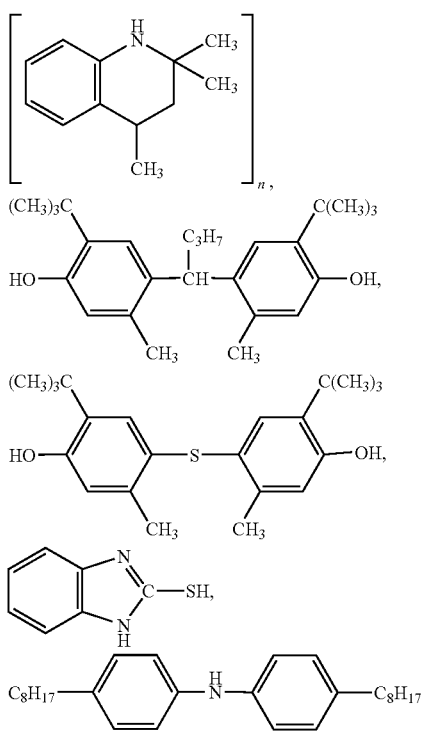

and a polyphenylene sulfide (PPS) resin, but are not limited thereto.

Among the above described compounds, in particular, a quinacridone pigment and an anthraquinone pigment and a PPS resin are preferable from the viewpoints of heat resistance and the plasma antiaging effects.

The compound having the plasma antiaging effects may be used solely or in a combination use of at least two kinds.

The amount of the compound having the plasma antiaging effects is preferably at least 0.5 part by weight based on 100 parts by weight of the fluorine containing elastomer and more preferably at least 2 parts by weight. The upper limit of an addition amount is preferably at most 20 parts by weight, more preferably at most 10 parts by weight and further preferably at most 5 parts by weight. When the addition amount is less than 0.5 part by weight, the plasma antiaging effect tends to be poor, and even if an amount of more than 5 parts by weight is added, the further improvement effects tend not to be expected.

The composition of the present invention may contain a filler.

Examples of the above mentioned filler are imide fillers having an imide structure such as polyimide, polyamidoimide and polyetherimide; organic fillers made of engineering plastics such as polyarylate, polysulfone, polyethersulfone, polyphenylene sulfide, polyether ether ether ketone and polyoxybenzoate; metal oxide fillers such as aluminum oxide, silicon oxide and yttrium oxide; metal carbides such as silicon carbide and aluminum carbide; metal nitride fillers such as silicon nitride and aluminum nitride; inorganic fillers such as aluminum fluoride and carbon fluoride.

Among those, aluminum oxide, yttrium oxide, silicon oxide, polyimide and carbon fluoride are preferable from the viewpoint of shielding effects of various plasmas.

The inorganic fillers and organic fillers may be used solely or in a combination use of at least two kinds.

The shapes of the fillers are not particularly limited, and not only a spherical shape but also a scale-like shape can be used. When the filler is a spherical shape, a molded article with a little anisotropy is obtained and when it is a scale-like shape, a molded article having reinforcing properties to a specific direction is obtained.

The particle diameter of the inorganic filler is preferably at most 0.5 µm, more preferably at most 0.2 µm and further preferably at most 0.05 µm. When the particle diameter is larger than 0.2 µm, the problem of generation of particles tends to be increased when used as a seal material for a semiconductor production device.

In case of the organic filler, the specific surface area is preferably at least 0.5 m$^2$/g and more preferably at least 2 m$^2$/g. When the specific surface area is less than 0.5 m$^2$/g, reinforcing properties are poor and strength at break tends to be lowered compared with a case that fillers are not used at all.

At present, a particle diameter of a commercially available filler is rough and the specific surface area becomes considerably small. It is required to enlarge the specific surface area by pulverizing the filler in order to use in the present invention. Examples of the pulverizing processes are a jet mill (dry pulverization), and a type of pulverizing process (wet pulverization) in which, after adding dispersion media such as water and an organic solvent to prepare into slurry, pressure is applied to a beads mill and liquid, and the slurry is injected from a nozzle to be collided in confront. It is preferable to use in a combination of the wet pulverization and dry pulverization (jet mill) to obtain a filler with a large specific surface area.

In the fluorine containing elastomer composition, the amount of the above mentioned filler is preferably 1 to 100 parts by weight based on 100 parts by weight of the fluorine containing elastomer and more preferably 5 to 50 parts by weight. When the amount of the filler is less than 1 part by weight, reinforcing properties are poor and sufficient plasma antiaging effects tend to be hardly obtained, and when it exceeds 100 parts by weight, sealing properties tend to lower.

In the present invention, in a field where high purity and staining property are not required, if necessary, an usual additive which are compounded in the fluorine containing elastomer composition such as a filler, a processing aid, a plasticizer and a colorant can be compounded, and one or more of usually used crosslinking agents and crosslinking aids different from the above described may be compounded.

The composition and materials for molding of the present invention can be prepared by mixing the respective component using an usual processing machine for an elastomer such as an open roll, a Banbury mixer, a kneader. Additionally, they can be also prepared by a process using an internal mixer.

The process of obtaining a preliminary molded article from the above described composition may be a conventional process and it can be carried out by a known process such as a process of heating and compressing with a mold, a process of inserting by pressure in a heated mold, and a process of extruding with an extruder. In case of an extrusion molded product such as a hose and an electric wire, a crosslinked molded article can be obtained by heat crosslinking with steam and the like after extrusion.

Curing conditions in the present invention is;

(Standard Composition)

| | |
|---|---|
| Fluorine containing elastomer | 100 parts by weight |
| Triallyl isocyanurate (TAIC) | 2 parts by weight |
| PERHEXA 25B | 1 part by weight |
| Filler | 15 parts by weight |
| Compound having plasma antiaging effects | 0.5 to 20 parts by weight |

(Standard Curing Condition)
Kneading method: Roll kneading
Press curing: For 7 minutes at 160° C.
Oven curing: For 4 hours at 180° C.
Curing is carried out under the conditions unless otherwise noticed.

The composition or the materials for molding are molded by crosslinking and the molded products can be preferably used for the seal material for sealing of a semiconductor production device, particularly, in which a high level of cleanness is required, and a semiconductor production device, particularly, in which a high density plasma irradiation is conducted. Examples of the seal material are an O-ring, a rectangular ring, a gasket, a packing, an oil seal, a bearing seal and a lip seal.

Further, the semiconductor production device mentioned in the present invention is not particularly limited to a device for producing a semiconductor, and includes a general production device used in the semiconductor field where a high level of cleanness is required, such as a device for widely producing a liquid crystal panel and a plasma panel. Examples are described in the following.
(1) Etching Device
  Dry etching device
    Plasma etching device
    Reactive ion etching device
    Reactive ion beam etching device
    Sputtering etching device
    Ion beam etching device
  Wet etching device
  Ashing device
(2) Cleaning Device
  Dry etching cleaning device
    UV/$O_3$ cleaning device
    Ion beam cleaning device
    Laser beam cleaning device
    Plasma cleaning device
    Gas etching cleaning device
  Extraction cleaning device
    Soxhlet extraction cleaning device
    High temperature and high pressure extraction cleaning device
    Microwave extraction cleaning device
    Supercritical extraction cleaning device
(3) Exposure Device
  Stepper
  Coater developer
(4) Polishing Device
  CMP device
(5) Film Forming Device
  CVD device
  Sputtering device
(6) Diffusion Ion Injection Device
  Oxidation diffusion device
  Ion injection device The seal material of the present invention exhibits excellent performance as the seal material of a device conducting plasma treatment such as, particularly, $NF_3$ plasma treatment, $O_2$ plasma treatment and fluorine plasma treatment, for example, a CVD device, a plasma etching device, a reactive ion etching deivce, an ashing device or an eximer laser exposure machine.

Hereinafter, the present invention is explained by experimental examples, but is not limited thereto.

EXAMPLE 1

2 Parts by weight of triallyl isocyanurate (TAIC), 1 part by weight of 2,5-dimethyl-2,5-di(t-butyl peroxy)hexane (PERHEXA 25B; available from NOF Corporation), 15 parts by weight of aluminum oxide (mean particle diameter; 0.02 μm, specific surface area; 80 $m^2/g$) and 2 parts by weight of an isoindolinone pigment (CROMOPHTAL Yellow 3RLP; available from Chiba Specialty Chemicals Co.) based on 100 parts by weight of a fluorine containing elastomer (DAI-EL PERFLO GA-105; available from Daikin Industries, Ltd.; a perfluoro elastomer comprising tetrafluoroethylene/perfluoro(alkyl vinyl ether) containing iodine as a crosslinkable group) were mixed, and the mixture was kneaded with an open roll to prepare a crosslinkable fluorine containing elastomer composition.

The fluorine containing elastomer composition was pressed at 160° C. for 7 minutes to conduct crosslinking, and then oven crosslinking was further carried out at 180° C. for 4 hours in an oven to prepare a test sample of O-ring (P-24). The compression permanent strain rate, the thermal aging test, curing properties, weight reduction at plasma irradiation and the number of surface particles of the test sample were measured by methods shown below. Results are shown in Table 1.

(Standard Composition)

| | |
|---|---|
| Fluorine containing elastomer | 100 parts by weight |
| Triallyl isocyanurate (TAIC) | 2 parts by weight |
| PERHEXA 25B | 1 part by weight |
| Filler | 15 parts by weight |
| Compound having plasma antiaging effects | 0.5 to 20 parts by weight |

(Standard Curing Condition)
Kneading process: Roll kneading
Press curing: For 7 minutes at 160° C.
Oven curing: For 4 hours at 180° C.

<Compression Permanent Strain Rate>

The above-mentioned standard compounds are primary press cured and secondary oven cured under the above-mentioned standard curing conditions to prepare an O-ring (P-24), and the compression permanent strain (CS) after the primary press curing and the compression permanent strain after the secondary oven curing are measured in accordance with JIS-K6301 (samples left alone for in a thermostatic chamber at 25° C. for 30 minutes after maintaining at 200° C. for 70 hours under compression of 25% pressuring are measured).

<Curing Properties>

Curing curves at 150° C. and 160° C. are measured at the primary press curing using a JSR Curelastometer II, and the lowest viscosity (kgf, the highest viscosity (kgf), induction time (min) and optimum curing time (min) are measured.

<Thermal Aging Test>

The 100% tensile stress ($kgf/cm^2$), tensile strength ($kgf/cm^2$), elongation (%) and hardness (SHORE A) of an O-ring (test sample) before heating (normal state) and after heating for 168 hours at 200° C. are measured, using a JIS No. 6 (ISO No. 2) super dumbbell, and the rate of change before and after heating is measured.

<Plasma Resistance>

Sample: O-Ring (P-24)

Plasma irradiation under conditions described below was carried out by using an ICP high density plasma device (MODEL RIE-101iPH; made by SAMCO Inc. (SAMCO International Laboratories)) to measure plasma resistance (both of $O_2$ plasma and $CF_4$ plasma were measured under the conditions described below).

(Plasma Irradiation Conditions)
Gas flow: 16 SCCM
RF output: 800 Wh
Pressure: 2.66 Pa
Etching time: 20 min.
Frequency: 13.56 MHz <Number of Surface Particles>

Supersonic wave is applied to a sample (O-ring) after plasma irradiation at 25° C. for one hour in ultra pure water, and particles separated are taken out in water to measure particle numbers (numbers/L) having a particle diameter of at least 0.2 μm by a fine particle measurement device process (a process by which light is irradiated to ultra pure water containing particles which were flown in a sensor portion, and permeability and the quantity of scattered light are electrically measured by a particle counter in liquid). A value converted to the particle number per one O-ring is shown in Table 3.

EXAMPLES 2 TO 15

The fluorine containing elastomer compositions and the O-rings were prepared in the same manner as Example 1 except for adding the compounds having plasma antiaging effects and the amounts shown in Tables 1 and 2. However, a filler was not added in Example 10. The results of the measurements are shown in Tables 3 and 4.

The compounds having plasma antiaging effects described in Tables 1, 2, 5 and 7 are shown below.

Available from Chiba Specialty Chemicals Co.:

| | |
|---|---|
| CROMOPHTHAL Yellow 3RLP | isoindolinone |
| CROMOPHTHAL Red 2020 | quinacridone |
| CROMOPHTHAL Red 2030 | diketopyrrolopyrrole |
| CROMOPHTHAL Magenta P | quinacridone |
| CROMOPHTHAL Blue A3R | anthraquinone |

Available from Kawaguchi Chemical Industry Co., Ltd.:

| | |
|---|---|
| ANTAGE RD | amine |
| ANTAGE W-300 | phenol |
| ANTAGE CRYSTAL | phenol |
| ANTAGE MB | amine and sulfur |

Available from Seikou Chemical Industry Co.:

| | |
|---|---|
| NONFLEX OD-3 | amine |

Available from DIC EP Inc. (TORPREN Inc.):
PPST-1 (PPS resin powder, 2 μm) sulfur

COMPARATIVE EXAMPLE 1

An experiment was conducted in the same manner as Example 1 except for adding no compound having plasma antiaging effects. The results of the measurement are shown in Table 3.

TABLE 1

| | Ex. | | | | | | | | | Com. Ex. |
|---|---|---|---|---|---|---|---|---|---|---|
| | 1 | 2 | 3 | 4 | 5 | 6 | 7 | 8 | 9 | 1 |
| DAI-EL PERFLO GA-105 | 100 | 100 | 100 | 100 | 100 | 100 | 100 | 100 | 100 | 100 |
| TAIC | 2 | 2 | 2 | 2 | 2 | 2 | 2 | 2 | 2 | 2 |
| PERHEXA 25B | 1 | 1 | 1 | 1 | 1 | 1 | 1 | 1 | 1 | 1 |
| Aluminum oxide | 15 | 15 | 15 | 15 | 15 | 15 | 15 | 15 | 15 | 15 |
| CROMOPHTAL Yellow 3RLP | 2 | | | | | | | | | |
| CROMOPHTAL Red 2020 | | 2 | | | | | | | | |
| CROMOPHTAL Red 2030 | | | 2 | | | | | | | |
| CROMOPHTAL Magenta P | | | | 2 | | | | | | |
| CROMOPHTAL Blue A3R | | | | | 2 | | | | | |
| Antage RD | | | | | | 2 | | | | |
| Antage W-300 | | | | | | | 2 | | | |
| Antage Crystal | | | | | | | | 2 | | |
| Antage MB | | | | | | | | | 2 | |

TABLE 2

|  | Ex. 10 | Ex. 11 | Ex. 12 | Ex. 13 | Ex. 14 | Ex. 15 |
|---|---|---|---|---|---|---|
| DAI-EL PERFLO GA-105 | 100 | 100 | 100 | 100 | 100 | 100 |
| TAIC | 2 | 2 | 2 | 2 | 2 | 2 |
| PERHEXA 25B | 1 | 1 | 1 | 1 | 1 | 1 |
| Aluminum oxide |  | 15 | 15 | 15 | 15 | 15 |
| CROMOPHTAL Red 2020 | 15 | 15 | 7.5 | 3.75 |  |  |
| NONFLEX OD-3 |  |  |  |  | 2 |  |
| PPST-1 |  |  |  |  |  | 2 |

TABLE 3

| Evaluation results | Ex. 1 | Ex. 2 | Ex. 3 | Ex. 4 | Ex. 5 | Ex. 6 | Ex. 7 | Ex. 8 | Ex. 9 | Com. Ex. 1 |
|---|---|---|---|---|---|---|---|---|---|---|
| Curing properties, 150° C. (JSR Curelastometer II) | | | | | | | | | | |
| The lowest viscosity (kgf) | 0.22 | 0.22 | 0.23 | 0.24 | 0.21 | 0.17 |  |  |  | 0.21 |
| The highest viscosity (kgf) | 5.30 | 5.35 | 5.35 | 5.34 | 5.08 | 3.45 |  |  |  | 5.30 |
| Induction time (min) | 1.4 | 1.3 | 1.1 | 1.3 | 1.4 | 3.8 |  |  |  | 1.0 |
| Curing time (min) | 2.3 | 2.5 | 2.0 | 2.2 | 2.7 | 7.0 |  |  |  | 1.8 |
| Curing properties, 160° C. (JSR Curelastometer II) | | | | | | | | | | |
| The lowest viscosity (kgf) |  |  |  |  |  | 0.14 | 0.13 | 0.13 | 0.13 | 0.20 |
| The highest viscosity (kgf) |  |  |  |  |  | 4.34 | 3.56 | 3.60 | 4.77 | 6.30 |
| Induction time (min) |  |  |  |  |  | 1.7 | 2.0 | 2.0 | 1.3 | 0.6 |
| Curing time (min) |  |  |  |  |  | 3.0 | 3.8 | 3.4 | 2.2 | 1.1 |
| Normal state (JIS No. 6 (ISO No. 2) super dumbbell) | | | | | | | | | | |
| 100% tensile at stress (kgf/cm$^2$) | 92 | 95 | 93 | 95 | 93 | 85 | 61 | 71 | 91 | 90 |
| Tensile strength (kgf/cm$^2$) | 250 | 267 | 254 | 240 | 237 | 241 | 256 | 252 | 236 | 243 |
| Elongation (%) | 170 | 170 | 170 | 170 | 170 | 170 | 200 | 190 | 170 | 160 |
| Hardness (SHORE A) | 78 | 79 | 78 | 79 | 78 | 78 | 79 | 78 | 80 | 75 |
| Thermal aging test (200° C. × 168 hours) | | | | | | | | | | |
| 100% tensile at stress (kgf/cm$^2$) | 88 | 94 | 89 | 96 | 94 | 80 | 50 | 55 | 86 | 93 |
| Tensile strength (kgf/cm$^2$) | 183 | 286 | 211 | 285 | 250 | 200 | 190 | 185 | 201 | 224 |
| Elongation (%) | 140 | 160 | 150 | 160 | 160 | 180 | 220 | 220 | 180 | 150 |
| Hardness (SHORE A) | 77 | 76 | 77 | 76 | 77 | 76 | 76 | 76 | 78 | 73 |
| ↑ Rate of change | | | | | | | | | | |
| ΔM100 (%) | −5 | −1 | −5 | 1 | 1 | −6 | −18 | −23 | −5 | 3 |
| ΔTB (%) | −27 | 7 | −17 | 18 | 5 | −17 | −26 | −27 | −15 | −8 |
| ΔEL (%) | −18 | −6 | −21 | −6 | −6 | 6 | 10 | 16 | 6 | −6 |
| Hardness change (point) | −1 | −3 | −1 | −3 | −1 | −2 | −3 | −2 | −2 | −2 |
| Compression permanent strain rate, 200° C. (P-24, O-ring) | | | | | | | | | | |
| 70 hours (%) | 21 | 22 | 21 | 21 | 23 | 28 | 48 | 45 | 28 | 21 |
| Plasma resistance (weight reduction rate %) | | | | | | | | | | |
| O$_2$ plasma | 0.69 | 0.70 | 0.71 | 0.67 | 0.73 | 0.69 | 0.70 | 0.67 | 0.71 | 0.78 |
| CF$_4$ plasma | 0.72 | 0.76 | 0.74 | 0.77 | 0.74 | 0.59 | 0.78 | 0.73 | 0.67 | 0.82 |
| Number of surface particles (×10$^4$/O-ring) | | | | | | | | | | |
| O$_2$ plasma | 9.1 | 9.3 | 9.5 | 8.8 | 9.6 | 9.2 | 9.3 | 8.9 | 9.4 | 10.4 |
| CF$_4$ plasma | 10.3 | 11.0 | 10.7 | 11.1 | 10.7 | 8.7 | 11.3 | 10.5 | 9.7 | 11.9 |

TABLE 4

| Evaluation results | Ex. | | | | | |
|---|---|---|---|---|---|---|
| | 10 | 11 | 12 | 13 | 14 | 15 |
| Curing properties, 150° C. (JSR Curelastometer II) | | | | | | |
| The lowest viscosity (kgf) | 0.13 | 0.22 | 0.29 | 0.41 | 0.14 | 0.19 |
| The highest viscosity (kgf) | 5.13 | 5.22 | 5.92 | 6.60 | 2.36 | 4.75 |
| Induction time (min) | 1.7 | 1.5 | 1.7 | 1.8 | 4.6 | 1.2 |
| Curing time (min) | 3.8 | 3.0 | 3.3 | 3.9 | 9.2 | 2.2 |
| Normal state (JIS No. 6 (ISO No. 2) super dumbbell) | | | | | | |
| 100% tensile at stress (kgf/cm$^2$) | 73 | 140 | 131 | 123 | 66 | 111 |
| Tensile strength (kgf/cm$^2$) | 165 | 201 | 225 | 224 | 163 | 187 |
| Elongation (%) | 190 | 140 | 150 | 150 | 170 | 140 |
| Hardness (SHORE A) | 82 | 89 | 86 | 83 | 78 | 82 |
| Compression permanent strain rate, 200° C. (P-24, O-ring) | | | | | | |
| 70 hours (%) | 17 | 33 | 27 | 24 | 28 | 22 |
| Plasma resistance (weight reduction rate %) | | | | | | |
| O$_2$ plasma | 3.49 | 0.65 | 0.66 | 0.67 | 0.65 | 0.69 |
| CF$_4$ plasma | 2.01 | 0.70 | 0.66 | 0.73 | 0.67 | 0.58 |

EXAMPLES 16 TO 19

Pure water was added to polyimide (UIP-S; available from Ube Industries, Ltd.) to prepare slurry with a solid content of about 20%, the slurry was pulverized to a fixed specific surface area with a circulation type beads mill and, then, the slurry dried in an electric oven was granulated with a jet mill to obtain polyimide having a specific surface area of about 10 m$^2$/g, a diameter of 3 μm and a thickness of 0.15 μm. The fluorine containing elastomer composition and a test sample were prepared in the same manner as Example 2 except for using the polyimide in place of aluminum oxide as a filler. The addition amounts of the compounds having plasma antiaging effects are shown in Table 5. The results of the measurements are shown in Table 6.

COMPARATIVE EXAMPLE 2

Experiment was carried out in the same manner as Example 16 except for adding no compound having plasma antiaging effects. The results of the measurements are shown in Table 6.

EXAMPLE 20

The fluorine containing elastomer composition and a test sample were prepared in the same manner as Example 1 except for using MT carbon black (N-990; available from Cancarb LTD., specific surface area; 10 m$^2$/g, mean particle diameter; 0.25 μm) in place of aluminum oxide as a filler. The addition amounts of the compounds having plasma antiaging effects are shown in Table 5. The results of the measurements are shown in Table 6.

COMPARATIVE EXAMPLE 3

Experiment was carried out in the same manner as Example 20 except for adding the compound having plasma antiaging effects. The results of the measurements are shown in Table 6.

TABLE 5

| | Ex. | | | | | Com. Ex. | |
|---|---|---|---|---|---|---|---|
| | 16 | 17 | 18 | 19 | 20 | 2 | 3 |
| DAI-EL PERFLO GA-105 | 100 | 100 | 100 | 100 | 100 | 100 | 100 |
| TAIC | 2 | 2 | 2 | 2 | 2 | 2 | 2 |
| PERHEXA 25B | 1 | 1 | 1 | 1 | 1 | 1 | 1 |
| MT carbon black | | | | | 15 | | 15 |
| Polyimide | 15 | 15 | 15 | 15 | | 15 | |
| CROMOPHTAL Red 2020 | 0.5 | 1 | 2 | 5 | 2 | | |

TABLE 6

| | Ex. | | | | | Com. Ex. | |
|---|---|---|---|---|---|---|---|
| Evaluation results | 16 | 17 | 18 | 19 | 20 | 2 | 3 |
| Curing properties, 150° C. (JSR Curelastometer II) | | | | | | | |
| The lowest viscosity (kgf) | 0.12 | 0.12 | 0.12 | 0.13 | 0.09 | 0.12 | 0.09 |
| The highest viscosity (kgf) | 5.70 | 5.70 | 6.05 | 6.15 | 4.57 | 5.65 | 4.85 |
| Induction time (min) | 1.3 | 1.4 | 1.5 | 1.7 | 4.7 | 1.3 | 1.4 |
| Curing time (min) | 2.5 | 2.9 | 3.1 | 3.4 | 4.2 | 2.2 | 3.4 |

TABLE 6-continued

| | Ex. | | | | | Com. Ex. | |
|---|---|---|---|---|---|---|---|
| Evaluation results | 16 | 17 | 18 | 19 | 20 | 2 | 3 |
| Normal state (JIS No. 6 (ISO No. 2) super dumbbell) | | | | | | | |
| 100% tensile at stress (kgf/cm$^2$) | 155 | 155 | 147 | 142 | 104 | 148 | 93 |
| Tensile strength (kgf/cm$^2$) | 171 | 176 | 170 | 165 | 214 | 158 | 249 |
| Elongation (%) | 130 | 130 | 130 | 140 | 170 | 130 | 200 |
| Hardness (SHORE A) | 82 | 81 | 82 | 84 | 82 | 80 | 81 |
| Compression permanent strain rate, 200° C. (P-24, O-ring) | | | | | | | |
| 70 hours (%) | 24 | 26 | 25 | 25 | 18 | 23 | 15 |
| Plasma resistance (weight reduction rate %) | | | | | | | |
| O$_2$ plasma | 2.29 | 2.15 | 2.09 | 2.05 | 3.32 | 2.38 | 3.69 |
| CF$_4$ plasma | 0.19 | 0.19 | 0.19 | 0.19 | 0.25 | 0.19 | 0.27 |

INDUSTRIAL APPLICABILITY

According to the present invention, the fluorine containing elastomer composition having stable effects even in an environment at a high temperature and, further, generating no particle after plasma irradiation by using the compound having plasma antiaging effects can be provided.

The invention claimed is:

1. A fluorine containing elastomer composition for a seal material of a semiconductor production device comprising a fluorine containing elastomer and a compound having plasma antiaging effects,
    wherein said compound having plasma antiaging effects is at least one selected from the group consisting of an isoindolinone pigment, a quinacridone pigment, a diketopyrrolopyrrole pigment and an anthraquinone pigment.

2. The fluorine containing elastomer composition of claim 1, wherein said fluorine containing elastomer is a perfluoro elastomer.

3. The fluorine containing elastomer composition of claim 1, wherein said compound having plasma antiaging effects is a compound containing no metallic atom.

4. The fluorine containing elastomer composition of claim 1, wherein at least 0.5 part by weight of said compound having plasma antiaging effects is contained based on 100 parts by weight of the fluorine containing elastomer.

5. The fluorine containing elastomer composition for the seal material of the semiconductor production device of claim 1, which is used for plasma process.

6. The seal material for the semiconductor production device comprising the fluorine containing elastomer composition of claim 1.

7. The seal material for the semiconductor production device for plasma process comprising the fluorine containing elastomer composition of claim 1.

* * * * *